Oct. 11, 1966 N. W. MITCHELL 3,278,169
APPARATUS FOR WATER REMOVAL FROM LIQUID-VAPOR CONTACTING TRAYS
Original Filed Aug. 10, 1961

INVENTOR
N. W. MITCHELL
BY
Young & Quigg
ATTORNEYS

United States Patent Office 3,278,169
Patented Oct. 11, 1966

3,278,169
APPARATUS FOR WATER REMOVAL FROM LIQUID-VAPOR CONTACTING TRAYS
Norris W. Mitchell, Phillips, Tex., assignor to Phillips Petroleum Company, a corporation of Delaware
Original application Aug. 10, 1961, Ser. No. 130,531. Divided and this application July 29, 1965, Ser. No. 475,799
3 Claims. (Cl. 261—7)

This is a division of my copending application Serial No. 130,531, filed August 10, 1961.

This invention relates to a liquid-gas contacting apparatus in which two immiscible liquids are present. In one aspect it relates to such an apparauts in which provision is made for separation and withdrawl of the heavier of two immiscible liquids during passage of gas or vapor in the desired liquid-gas contacting operation.

In many instances liquid water is present in liquid-gas contacting columns in operations involving the contacting of non-aqueous liquids with gases. Open steam is frequently used in stripping and fractional distillation columns. Such columns are sometimes operated under steam condensing conditions and the condensate or water so formed flows downwardly in the columns displacing a portion of the desired internal reflux. When processing hydrocarbon liquids under such conditions water is retained as the lower layer on each contacting tray. Retention time of the hydrocarbon liquid undergoing contacting is reduced in proportion to the ratio of the volume of the hydrocarbon to the volume of the hydrocarbon plus water on a tray. For example, if the liquid on a tray is half water obviously the retention time and therefore the effective contacting time is reduced to one half of that in the absence of water. Also, water sometimes reduces the effectiveness of the liquid hydrocarbon-gas contacting just by its presence. For example, in the seething mass of liquid and gas on a vapor-liquid contacting tray it is easy to visualize droplets of a liquid hydrocarbon surrounded by a film of water thereby markedly reducing the desired effectiveness of the hydrocarbon-gas contacting.

An object of this invention is to provide vapor-liquid contacting apparatus for improving the efficiency of vapor-liquid contacting operations. Another object of this invention is to provide apparatus which is simple and relatively inexpensive to manufacture for improving the effectiveness of vapor-liquid contacting operations. Yet another object of this invention is to provide apparatus for withdrawing an unwanted immiscible heavy liquid phase from vapor-liquid contacting trays during normal operations. Other objects and advantages of this invention will be realized upon reading the following description which taken with the attached drawing forms a part of this specification.

Figure 1:
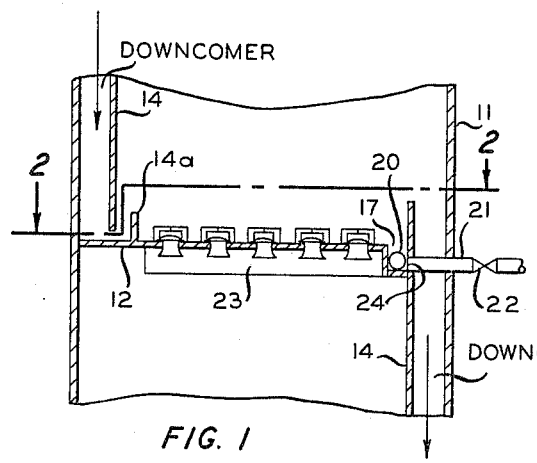
Figure 4:
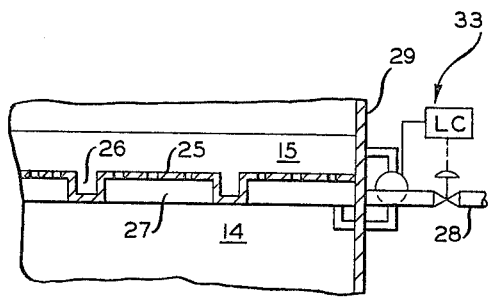
Figure 2:
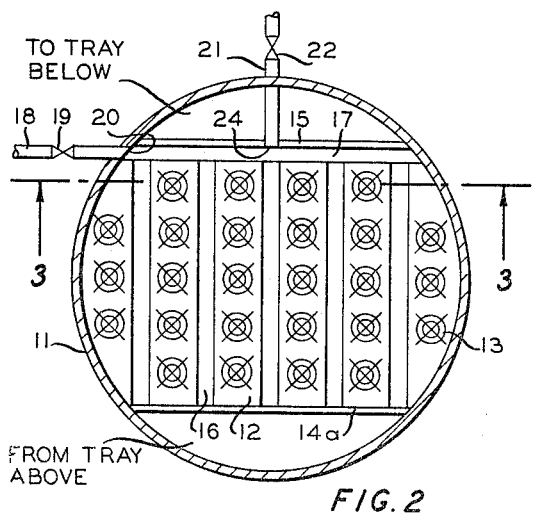
Figure 5:
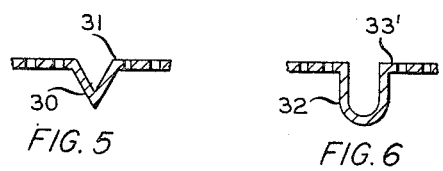
Figure 6:
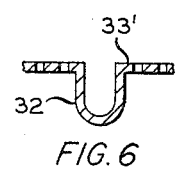
Figure 3:
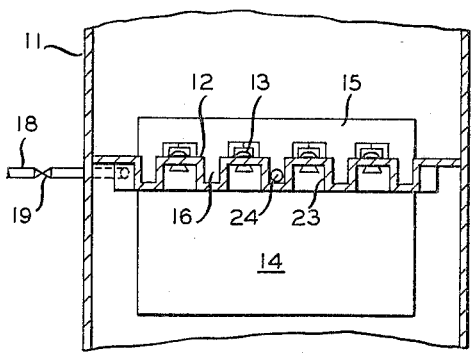
Figure 7:
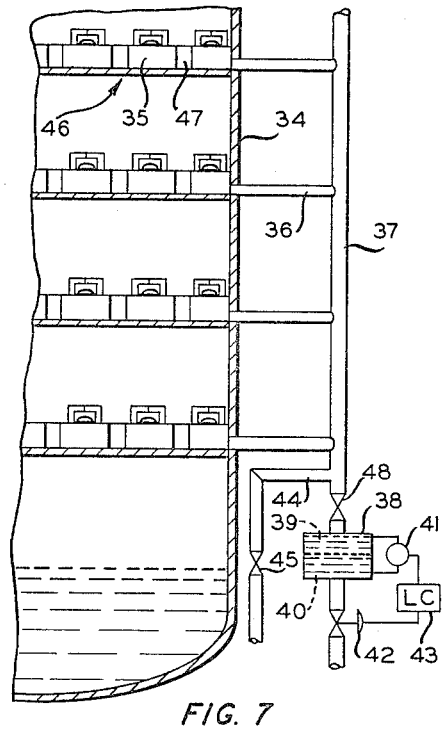

In the drawing, FIGURE 1 is a sectional view of a portion of a vapor-liquid contacting column provided with a water take-off tray assembly constructed in accordance with this invention. FIGURE 2 is a horizontal sectional view of the vapor-liquid contacting column taken on the line 2—2 of FIGURE 1. FIGURE 3 is a sectional view taken on the line 3—3 of FIGURE 2. FIGURE 4 is a sectional view illustrating one embodiment of the drain trough of this invention and one means for water withdrawal therefrom. FIGURE 5 illustrates another embodiment of the draw-off trough. FIGURE 6 illustrates still another embodiment of the draw-off trough. FIGURE 7 is an elevational view, partly in section, of alternate means for withdrawing water from one or more trays of a vapor-liquid contacting column.

In the drawing, reference numeral 11 identifies a vapor-liquid contacting column such as a fractional distillation column provided with the apparatus of this invention. In this column a tray deck 12 is positioned horizontally and provided with vapor-liquid contacting bubble caps, valves or other suitable type of vapor-liquid contacting apparatus 13. Reference numeral 14 identifies a plate extending below a column tray for defining a downcomer from one contacting tray to the next. Plate 14a maintains a level of liquid on tray 12 in the downcomer area so that vapor will not pass upward through the downcomer. A plate 15 extends upward and is a weir plate while the plate 14 extends downward from weir plate 15 to define the downcomer to a next lower tray.

Between weir plate 15 and the main portion of tray deck 12 is a header trough 17. This header trough is shown in FIGURES 1, 2, and 3. In FIGURES 1 and 3 is shown a plate 23 which is one wall of a trough 16 illustrated specifically in FIGURES 2 and 3. At one end of header trough 17 an opening 20 in the wall 11 of the vessel communicates with a horizontal pipe 18 which is provided with a valve 19. Pipe 18 is so provided that it can remove liquid from the bottom of the trough 17 laterally and directed thru wall 11.

In FIGURES 1 and 2 is shown an alternative means for withdrawal of liquid from the bottom of trough 17. This alternative means comprises an opening 24, in weir plate 15. Opening 24 accommodates one end of a pipe 21 which extends through the wall of the vessel as shown. Pipe 21 is provided with a flow control valve 22. While either one of these means for withdrawal of, for example, water, from trough 17 is operable, the embodiment involving opening 20, pipe 18 and valve 19 is preferred.

In the operation of the foregoing embodiment of the apparatus a vapor being processed passes upward in column 11 through the caps or valves 13 to contact liquid flowing across the tray. Any water carried in this liquid and particularly when the liquid is a hydrocarbon liquid tends to settle to the surface of the tray or to seek a low point. I have provided a low level or low point for separation of the water. The troughs 16 are positioned at intervals across the tray and provide ample opportunity for separation of water from the hydrocarbon liquid being processed. Water collecting in troughs 16 flows into the header trough 17 and ultimately through either opening 24 to pipe 21 or through opening 20 to pipe 18 for disposal.

As illustrated in FIGURE 4, I provide an automatic means for removal of water from such a tray. This tray, however, is illustrated as being a punched or perforate tray 25 provided with troughs 26 which discharge into a header trough 27. Liquid from the bottom portion of header trough 27 can pass through outlet pipe 28 for such disposal as desired. Such a tray is provided with a weir plate 15 similar to that described in FIGURES 1 and 2. Since the level of liquid being treated is defined by the height of the weir plate a liquid level controller, or interface controller, 33 with its conventional auxiliary apparatus is provided. As shown in FIGURE 4, this interface or level controller 33 is fed a signal from, for example, a float in response to its position as indicating an interface between the water and the hydrocarbon oil and the controller operates a motor valve in response to this level of interface for withdrawal of the heavy phase from the header trough 27. Reference numeral 29 identifies the wall of a vapor-liquid contacting column provided with the apparatus just described.

The particular vapor-liquid contacting apparatus illustrated, for exemplary purposes, in FIGURES 1 and 2 is intended to be the liquid-gas contacting apparatus described in U.S. Patent 2,979,316.

In FIGURE 3 of the drawing are shown the several troughs 16 in section which are shown in plan view in FIGURE 2.

As illustrated in FIGURES 1, 2, 3, and 4 the troughs have a square or rectangular cross section. It is not essential that the troughs 16 or the header trough 17 be of such cross section because if desired, the cross section of these troughs can have other forms such as a V-shaped trough 30 positioned below a tray deck 31 illustrated in FIGURE 5 or the trough can be a U-shaped trough 32 positioned below deck 33 as illustrated in FIGURE 6.

As mentioned hereinabove water is removed from vapor-liquid contacting columns for various reasons. In the operation of such apparatus as illustrated in FIGURES 1, 2, and 3 valves 19 and 22 can be operated manually if desired. If it is desired to make the water withdrawal automatic the apparatus illustrated in FIGURE 4 provides a simple solution to the problem.

If desired, a single tray according to this invention can be provided in a vapor-liquid contacting column for water removal or if appreciable water is to be withdrawn two or more trays can be provided with troughs 16 and header trough 17 for water removal. Such a column provided with a plurality of water draw-off trays is illustrated in FIGURE 7. In this figure a column 34 is provided with a plurality of water take-off trays 46 as illustrated. Each of these trays is provided with suitable vapor-liquid contacting apparatus such as the apparatus described in the above-mentioned patent or, if desired, conventional bubble cap contactors or other suitable type can be used. Each of these trays 46 is provided with a header trough 35 and feeder trough 47. The water flows from the tray deck into the feeder troughs and thence into the header trough for removal from the column. Separate pipes 36 extend through the wall of the column for withdrawal of water from each header trough of the several trays. These pipes communicate with a header pipe 37 arranged vertically along the outside of the column. At a level somewhat near the ground level the header pipe 37 is provided with a small vessel 38. Connected with vessel 38 is a vessel 41 provided with a float for sensing the position of the interface between the water 40 and a liquid hydrocarbon 39. The float in float vessel 41 transmits a signal to a controller 43 which in turn transmits a signal to a motor valve 42 for opening or for throttling the valve depending upon the interface between liquids 39 and 40. When interface between these liquids is high the motor valve opens for withdrawal of water and when the interface reaches a predetermined level the motor valve closes. While this automatic water withdrawal means is in operation a valve 45 in a bypass pipe 44 is closed. If, however, it is ever decided to operate this water withdrawal apparatus manually a valve 48 in the header conduit 37 is closed and the manually operable valve 45 is open. Since in many instances the amounts of water collecting on trays is not particularly large, such a valve as valve 45 need be opened only at intervals during the column's operation. For example, it might be necessary only to open valve 45 once or twice during an eight hour shift. In such a case valve 45 is opened slightly and maintained open as long as water discharges from the end of bypass pipe 44. When the first liquid in process appears, valve 45 is then closed.

Header pipe 37 as illustrated in the drawing is maintained full of hydrocarbon liquid. Any water separated out on trays 46 and passing through troughs 45, header trough 35, and out from the column through connecting pipes 36 into the header pipe flows downward as a stream or as droplets of immiscible liquid in the liquid hydrocarbon in the header pipe. This water being heavier than the liquid hydrocarbon flows downward and accumulates in the vessel 38. When water flows downward through header pipe 37 the water-hydrocarbon interface in vessel 38 rises. As mentioned hereinbefore when this interface rises to a predetermined level the float, liquid-level controller, motor valve 42 operates to withdraw a portion of the water from vessel 38.

The top or upper end of the header pipe 37 can if desired be provided with a vapor or fluid-tight cap or if desired the upper end of the pipe can be tied into the column.

Water entering header pipe 37 from an upper tray will not re-enter the column on its downward descent in header pipe 37 because it falls freely therein into the vessel 38.

In one instance and as an example of the specific apparatus of this invention, the depth or height of the troughs 16 and header trough 17 was one and one-half inches while the distance from the top of these troughs or from the top surface of the vapor-liquid contacting tray to the top of the weir plate was two and one-half inches. The diameters of these troughs 16 and the header trough 17 are sized such as to accommodate amply the volume of water to be removed from the trays. That is, if large amounts of water are to be removed then these several troughs should have appreciable widths as for example, one to two inches. In case only very minor volumes of water are to be removed, troughs 16 can be for example, one-fourth to one inch in width while header trough 17 is of a width of approximately two inches.

These troughs and other structural materials used therewith can, if desired, be the same materials as used in construction of the trays with which they are used.

While certain embodiments of the invention have been described for illustrative purposes, the invention obviously is not limited thereto.

I claim:

1. In an upright cylindrical fractional distillation column for separating a first liquid phase from a second heavier liquid phase immiscible therewith, the combination of:
   (1) a horizontal generally planar tray in the upper section of said column provided with means for effecting liquid-vapor contacting between vapor rising thru said column and liquid descending said column with phase separation on said tray;
   (2) a header trough along and subjacent one edge of said tray for collecting the heavier liquid, the radially outer wall of said trough extending to a level above the top of said tray;
   (3) at least one trough in said tray for draining said heavier liquid into the trough of (2);
   (4) conduit means leading from the lower section of the trough of (2) thru the wall of said column substantially at tray level;
   (5) a downcomer depending from said header trough; and
   (6) an upright weir on the upper surface of said tray extending across said column opposite said header trough.

2. Apparatus in combination comprising:
   (1) an upright cylindrical fractional distillation column;
   (2) at least one tray in an upper section of said column comprising:
      (a) a generally horizontal flat plate engaging the wall of said column along the periphery of said plate except in a restricted section of said column in which the edge of said plate is substantially straight;
      (b) a plurality of spaced-apart troughs depending from the plate of (a) and running generally perpendicular to its straight edge a substantial portion of the distance across said plate;
      (c) a header trough along the straight edge of (a) communicating with the troughs of (b), the outer edge thereof extending above plate level;
      (d) openings in the plate of (a) intermediate said troughs and means covering said openings for maintaining a liquid level on said tray and effecting gas-liquid contact; and (e) a depending flange on the header trough of (c) providing a downcomer to the next lower tray; and (3) an outlet conduit from the header trough of (c) passing thru the wall of said column.

3. The apparatus of claim 2 including a series of said trays, alternate trays in said series being positioned correspondingly to the tray of (2), the trays intermediate said alternate trays being reversed so that the downcomer of (e) extends to a line just above tray level and opposite the header trough of (c), the plate of (a) of each tray below the uppermost being provided with an upright weir on its upper surface radially inside of the downcomer from the next tray above; an outlet conduit of (3) from each said tray; and means for controlling the flow of liquid thru said outlet conduits.

References Cited by the Examiner
UNITED STATES PATENTS

| | | | |
|---|---|---|---|
| 2,180,811 | 11/1939 | King | 210—114 |
| 2,652,238 | 9/1953 | Manley | 261—114 |
| 2,812,827 | 11/1957 | Worly et al. | 210—114 X |
| 2,917,372 | 12/1959 | Wallin | 261—114 |

REUBEN FRIEDMAN, *Primary Examiner.*

SAMIH N. ZAHARNA, *Examiner.*